United States Patent [19]

Yoshio

[11] Patent Number: 5,130,816
[45] Date of Patent: Jul. 14, 1992

[54] METHOD AND APPARATUS FOR RECORDING AND REPRODUCING INFORMATION INCLUDING PLURAL CHANNEL AUDIO SIGNALS

[75] Inventor: Junichi Yoshio, Tokorozawa, Japan

[73] Assignee: Pioneer Electronic Corporation, Tokyo, Japan

[21] Appl. No.: 383,765

[22] Filed: Jul. 24, 1989

[30] Foreign Application Priority Data

Feb. 9, 1989 [JP] Japan .................. 1-30524

[51] Int. Cl.$^5$ .............................. H04N 5/76
[52] U.S. Cl. .................. 358/341; 358/343; 369/59; 369/49
[58] Field of Search .............. 358/341, 342, 343, 335, 358/143, 144; 360/19.1, 33.1, 32, 23; 369/49, 59, 86, 87

[56] References Cited

U.S. PATENT DOCUMENTS

| | | | |
|---|---|---|---|
| 3,859,458 | 1/1975 | Takezawa et al. | 358/143 |
| 4,353,098 | 10/1982 | Heinz et al. | 360/19.1 |
| 4,393,489 | 7/1983 | Mehrotra | 369/49 |
| 4,433,347 | 2/1984 | Sugiyama et al. | 358/342 |
| 4,468,710 | 8/1984 | Hashimoto et al. | 360/19.1 |
| 4,472,830 | 9/1984 | Nagai | 358/144 |
| 4,587,643 | 5/1986 | Monen et al. | 369/59 |
| 4,647,985 | 3/1987 | Yokosawa | 358/341 |
| 4,672,472 | 6/1987 | Sugiyama | 358/341 |

Primary Examiner—Donald McElheny, Jr.
Attorney, Agent, or Firm—Foley & Lardner

[57] ABSTRACT

A method for recording and reproducing information, including plural channel audio signals on and from a recording medium. A sampling operation at a predetermined sampling frequency is respectively performed against plural channel audio signals, a modulation operation of a predetermined modulation system is performed respectively for each of a plurality of channels of the sampled data, an identification code identifying each channel is added to each of plural channel coded information signals, and subsequently the coded information signals are multiplexed by a time division multiplexing operation and recorded on the recording medium, together with one channel analog audio signal or by themselves. At the time of playback, at least two of the plural channel coded information signals designated by a selection command or at least two of the plural channel coded information signals and the one channel analog audio signal designated by the selection command selectively decoded arbitrarily using the identification code, and a reproduction signal is generated by mixing the two channels of audio signal. With this feature, a single disc can be used for recording a program having multilingual audio signals.

11 Claims, 4 Drawing Sheets

METHOD AND APPARATUS FOR RECORDING AND REPRODUCING INFORMATION INCLUDING PLURAL CHANNEL AUDIO SIGNALS

BACKGROUND OF THE INVENTION

1. Field of the Invention

The present invention relates to method and apparatus for recording and reproducing information on and from a recording medium, such as a video disc or a digital audio disc.

2. Description of Background Information

A recording system has been proposed in Japanese Patent Application No. P63-46603, in which graphics codes, including picture information and instruction codes indicating a mixing ratio at each point in a two-dimensional picture formed by a video format signal are recorded as being inserted as a subcode of a coded information signal, and at the time of playback a signal according to the graphics code is mixed to the video format signal at each point of the video format signal according to the instruction codes.

With the system of the above-mentioned prior application, captions in a plurality of different languages can be previously recorded in a manner that each of the captions is recorded respectively in each of channels of the subcode, and a superimposed caption in a designated language can be selectively displayed at the time of playback.

Although the use of the superimposed caption an effective measure for dealing with a multilingual program source, there has been a problem that the time for viewing the major part (other than the caption) of the picture is shortened by the necessity of viewing the superimposed caption. Therefore, in the case of the recording and reproducing system of the prior application, there has been a drawback that a program's appeal to the viewer will be dwindled by the necessity of viewing the superimposed caption.

OBJECT AND SUMMARY OF THE INVENTION

An object of the present invention is, therefore, to provide a method and apparatus of recording and reproducing information, in which a plurality of audio signals corresponding to speech in a plurality of languages can be recorded on a recording medium, and an audio signal corresponding to the speech in a desired language can be obtained from among the plurality of audio signals recorded on the recording medium.

In the recording and reproducing method of the present invention, a sampling operation at a predetermined frequency is respectively performed against N (N is an integer equal to or greater than 3) channels or M (M is an integer equal to or greater than 2) channel audio signals, a modulation operation of a predetermined modulation system is performed respectively for each of N or M channels of the sampled data, an identification code identifying each channel is added to each of N or M channel coded information signals, and subsequently the coded information signals are multiplexed by a time division multiplexing operation and recorded on a recording medium together with a channel of analog audio signal or by themselves. At the time of playback, at least two of the N channel coded information signals designated by a command or at least two of the M channel coded information signals and the one channel analog audio signal designated by the command are selected and decoded arbitrarily using the identification code, and a reproduction signal is generated by mixing the at least two channels of audio signal.

DETAILED DESCRIPTION OF THE PREFERRED EMBODIMENT

The embodiment of the present invention will be specifically described with reference to the accompanying drawings.

Figure 1:
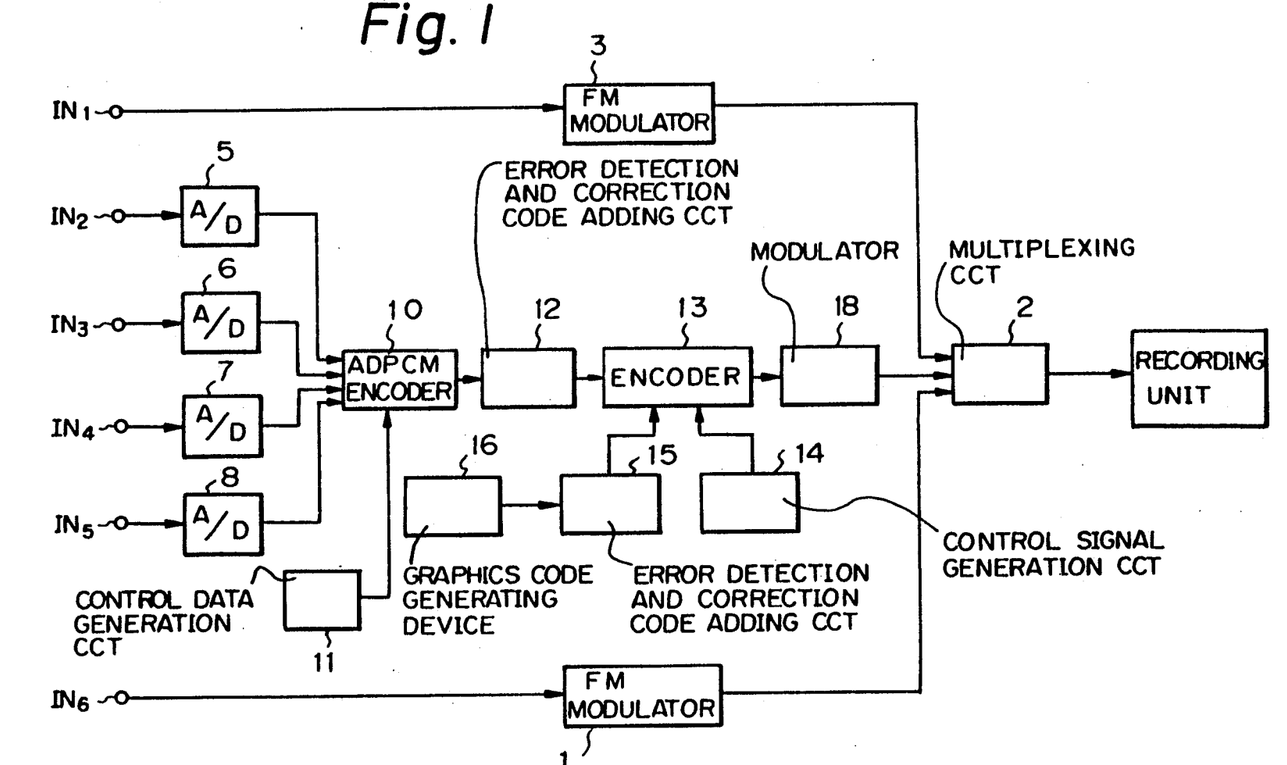
FIG. 1 is a block diagram showing a recording apparatus according to the present invention.

In FIG. 1, audio signals of five channels and a video format signal which are output from a video tape recorder, for example, are respectively supplied to input terminals $IN_1$ through $IN_5$ and $IN_6$. The video format signal is supplied to an FM modulator 1 in which a carrier signal of 8 MHz, for example, is modulated by the video format signal. An FM signal output from this FM modulator 1 is in turn supplied to a multiplexing circuit 2. On the other hand, the audio signal of a channel CH1 is supplied to an FM modulator 3 in which a carrier signal of 2.3 MHz, for example, is modulated in frequency by the audio signal of the channel CH1. An FM signal output from this FM modulator 3 is supplied to the multiplexing circuit 2.

The audio signals of channels CH2 through CH5 supplied through the input terminals $IN_2$ through $IN_5$ are supplied to an analog-to-digital converting circuits (referred to as A/D converters hereinafter) 5 through 8. The A/D converters 5 through 8 are configured respectively to sample the audio signal of each channel at a sampling frequency of 37.8 KHz, generate a digital data corresponding to the obtained sampled value, and to output the generated digital data. The output data of the A/D converters 5 through 8 are supplied to an ADPCM encoder 10. The ADPCM encoder 10 is, for example, configured to compress the data into blocks on the basis of the standard of discs designated CD-I, and to multiplex the data with an output data of a control data generating circuit 11.

Figure 2:
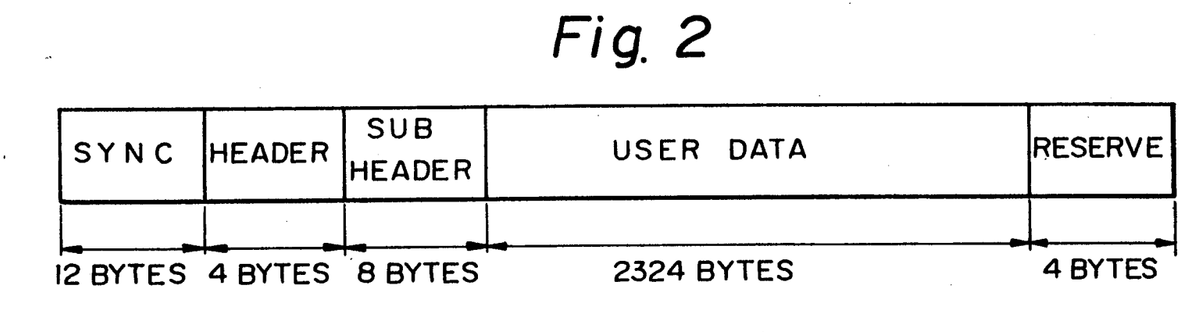
FIG. 2 is a diagram showing the structure of data blocks in the CD-I.

In the case of CD-I, the first 12 bytes of each block comprise a sync signal called sync, and the 4 bytes following the sync comprise the data group and are called the header. Of the 4 bytes of the header, 3 bytes include address information as in the case of the subcode. That is, the 3 bytes form BCD codes indicating time in minutes, seconds and frames. Eight bytes after the header comprise a data group, called the subheader. The subheader contains attribute data required for processing blocks each having only audio, video, or control data, by a time division multiplexing using each block as a unit, and for executing a real-time processing for that purpose. Such attribute data is written twice in the subheader. Each of 4 bytes of the subheader is called file number, channel number, submode, and data type.

The file number is a flag to be used, when blocks belonging to the same file are interleaved, for identifying such a state.

The channel number is a flag for discriminating blocks which may be selectively used in the same file, and as many as 32 channels can be defined. For instance, this flag may be used in case two channels in English and in Japanese are prepared in the same file and either one of the channels is to be selected by the user.

In the submode, a flag indicating the attribute of the block is contained. For example, a flag to be used for the discrimination between form 1 and form 2, or a flag indicating whether the block carries an audio data (audio block) or a control data (control block) is contained in the submode.

The data type has different definitions depending on the type of block, i.e., the audio block, video block, or data block. For example, in the case of the audio block, a flag indicating the type of coding of the audio signal is contained in the data type.

In the case of the data structure of the CD-I, there are two forms i.e., form 1 and form 2, which can be identified by the flag in the subheader. The ADPCM encoder 10 in the recording system is configured to form a data block of the form 2 which is illustrated in FIG. 2. In the case of the form 2, a user data of 2324 bytes and a reserve data of 4 bytes are arranged after the subheader.

Figure 3:
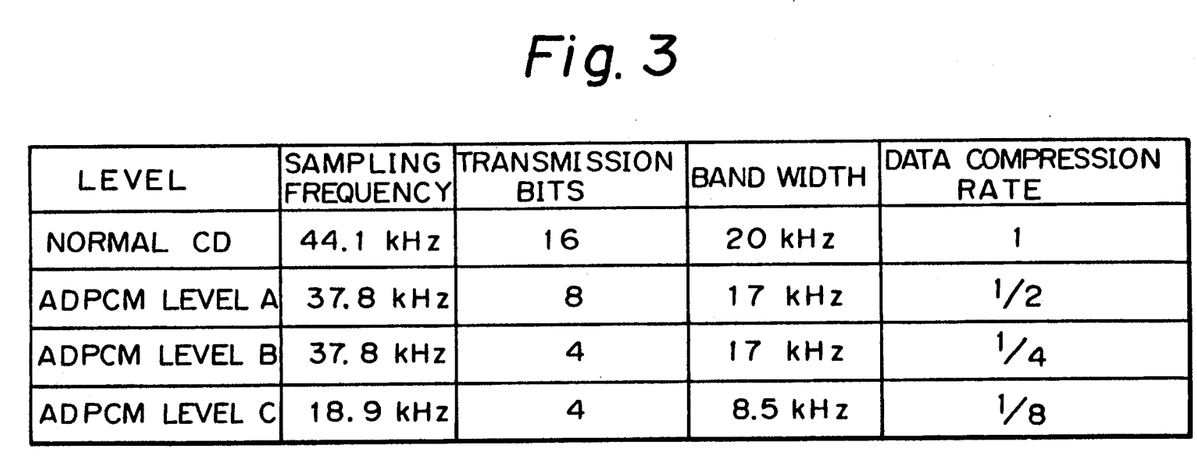
FIG. 3 is a diagram explaining the audio signals in the CD-I.

On the other hand, four types of audio data shown in FIG. 3 are prepared as the audio data of the CD-I. Of these four types, three types are ADPCM data which are named level A, level B, and level C, respectively. The ADPCM encoder 10 is configured to form a level B data, that is, an ADPCM data having four bits of the transmission bits, whose bandwidth and compression rate are 17 kHz and ¼ respectively.

The control data generation circuit 11 is configured to store control data representing commands to the disc player such as the search command, pause command, which are previously input by the key operation for example, to compose blocks having the stored control data as its user data as illustrated in FIG. 2, and to output the blocks in response to command signals.

The output signal of the ADPCM encoder 10 is supplied to a CD system encoder 13 through an error detection and correction code adding circuit 12. The CD system encoder 13 also receives output signals of a control signal generating circuit 14 and an error-detection/correction code adding circuit 15. The control signal generating circuit 14 is configured to generate such data as a data indicating the elapsed time after the start of the application of the audio signals to input terminals $IN_1$ through $IN_5$ and a data indicating the pause between program areas and the program area of the audio signal.

Output data of a graphics code generating device 16 is supplied to the error detection and correction code adding circuit 15. The graphics code generating circuit 16 is configured to store a graphics code corresponding to a picture processing instruction which has been input by a key operation for example, and to read out the stored graphics code in response to a command, and to output it. The error detection and correction code adding circuit 15, on the other hand, is configured to perform interleaving of the output data of the graphics code generating circuit 16 and adding of correction codes.

The CD system encoder 13 is configured to use the output signal of the control signal generating circuit 14 as the data of the Q and P channels of the subcode on the basis of the CD system, to use the output signal of the graphics code generating circuit 16 as the data of the R through W channels of the subcode, and to form a recording signal by inserting the subcode data into the digital data from the ADPCM encoder 10. The output signal of the CD system encoder 13 is supplied to a modulator 18 in which the input signal is converted to an EFM (Eight to Fourteen Modulation) modulation signal. The output signal of the modulator 18 is supplied to the multiplexing circuit 2 where it is multiplied in frequency with the FM-modulated video format signal and the audio signal of the channel CH1.

The output signal of the multiplexing circuit 2 is supplied to a light modulator (not shown) of the optical disc player, so that the intensity of the light beam irradiated on the recording surface of the disc is modulated. The disc is rotated so that the linear velocity is kept constant. As a result, the graphics code including picture information is recorded as the subcode on the recording disc, in addition to the FM modulated video format signal, the audio signal of the channel CH1, and the digital audio signal which comprises the ADPCM data signal as the coded information signal.

The graphics code generating device 16 is configured to generate various codes corresponding to the picture processing instructions based on the picture information recording and reproducing system utilizing the subcode, which is described in Japanese Patent Application Laid Open No. P63-46603.

Figure 4:
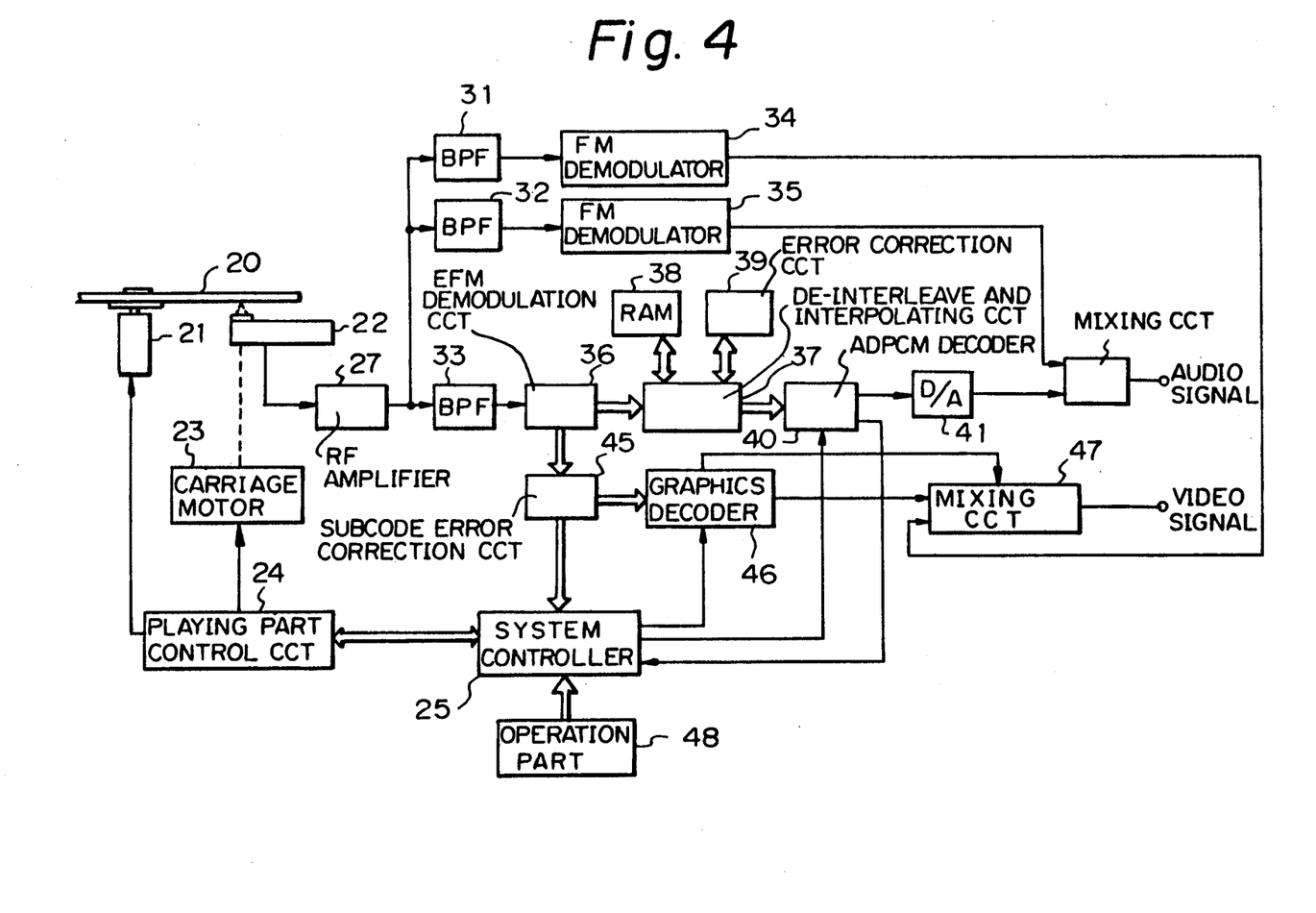
FIG. 4 is a block diagram showing an apparatus for playing a disc on which information is recorded by the apparatus shown in FIG. 1.

FIG. 4 shows a disc player for playing a disc on which information has been recorded by the above-described recording system. As shown, the disc 20 is driven by a spindle motor 21. As the disc 20 rotates, the signal recorded on the disc is read by means of a pickup 22. The pickup 22 is carried on a carriage (not shown) which is driven by a carriage motor 23 and movable in a radial direction of the disc 20. With this arrangement, the position of an information reading point (information reading light spot) of the pickup 22 is arbitrarily determined in the radial direction of the disc 20. Furthermore, the player is provided with various servo systems such as the spindle servo system, focus servo system, tracking servo system, and carriage servo system. Since these servo systems themselves are well known, the explanation thereof is not given in the specification.

The spindle motor 21 and the carriage motor 23 are respectively driven by the spindle servo system and the carriage servo system, or driven by a playing part control circuit 24. In response to commands from the system controller 25, the playing part control circuit 24 performs various operations such as the drive of the spindle motor 21 and the carriage motor 23, and the on-off control of the servo systems mentioned above, and the jump control.

The RF (radio frequency) signal output from the pickup 22 is amplified by an RF amplifier 27 and supplied to FM demodulation circuits 34 and 35 and to an EFM demodulation circuit 36 through band-pass-filters (BPFs) 31, 32, and 33 respectively. The frequency characteristics of the BPFs 31, 32, and 33 are chosen to permit only the video format signal component, the audio signal component of the channel CH1, and the digital audio signal component respectively.

The EFM demodulation circuit 36 is configured to perform an EFM demodulation operation of a pulse signal obtained by slicing the digital audio signal separated from the RF signal by means of the BPF 33, and to obtain the digital data and subcode including audio information and control information. The digital data including the audio information and the control information output from the EFM demodulation circuit 36 is supplied to the de-interleaving and interpolating circuit 37. The interleaving and interpolating circuit 37 is configured to perform the following operations. In cooperation with RAM 38, the de-interleaving and interpolating circuit 37 puts the digital data in its original order, whose order has been changed by the interleaving operation at the time of recording. The de-interleaving and interpolating circuit 37 then transmits the digital data to an error correction circuit 39, and performs the interpolation of erroneous data in the output data of the error correction circuit 39 by using the average value interpolation method for example, when a signal indicating the impossibility of the correction is issued from the error correction circuit 39. The error correction circuit 39 is configured to perform an error correction operation using the CIRC (Cross Interleave Reed Solomon Code) and to supply the digital data to de-interleaving and interpolating circuit 37, and to generate the signal indicating the impossibility of the correction if the correction of error is not possible.

From the de-interleaving and interpolating circuit 37, data having a block structure as shown in FIG. 2 is output, and supplied to an ADPCM decoder 40. Furthermore, a data from the system controller 25 indicating the channel designated by a manual operation is supplied to the ADPCM decoder 40. The ADPCM decoder 40 is configured to perform the following operations. At first, the ADPCM decoder 40 compares the channel number in the subheader of the data block output from the de-interleaving and interpolating circuit 37 with the output data of the system controller 25, and decodes only the ADPCM data of blocks of the designated channel. On the other hand, the ADPCM decoder 40 senses blocks in which the control data is user data, by using the submode in the subhead of the data blocks output from the de-interleaving and interpolating circuit 37, and extracts the control data and transmits it to the system controller 25 subsequently.

The ADPCM data demodulated by the ADPCM decoder 40 is supplied to a D/A (digital-to-analog) converting circuit 41, so that it is converted to an analog audio signal. The audio signal output from the D/A converting circuit 41 is supplied to a mixing circuit 42 which comprises an adder for example, where it is mixed with the audio signal of the channel CH1 demodulated by the FM demodulation circuit 35.

On the other hand, the subcode output from the EFM demodulation circuit 36 is supplied to a subcode error correction circuit 45 where it is treated by the error correction operation. The P and Q-channel bits of the subcode are supplied to the system controller 25. The R through W channels of the subcode to which the error correction process has been performed by the subcode error correction circuit 45 are supplied to a graphics decoder 46.

The graphics decoder 46 includes, for example, 16 memories respectively corresponding to channels which are formed by the R through W channels of the subcode and designated by the channel number bits in the graphics codes including picture information. The graphics decoder 46 is configured to write data into these memories according to the graphics codes, to form a video format signal by successively reading out data stored in a memory corresponding to a channel designated by the output data of the system controller 25, and to output the video format signal. The graphics decoder 46 also forms data indicating the mixing ratio in a mixing circuit 47, and output the data subsequently. The mixing circuit 47 comprises a video switch for example, and is configured to mix the video format signal output from the graphics decoder 46 and the video format signal output from the FM demodulation circuit 34 at a mixing ratio according to the output data of the graphics decoder 46. The output signal of the mixing circuit 47 is supplied to a video output terminal. By the operation of the graphics decoder 46 and the mixing circuit 47, an image produced from the subcode is inserted into the video image produced by the video format signal recorded by the FM modulation, so that the superimposition of a caption, for example, is enabled. In addition, the details of the graphics decoder 46 and the mixing circuit 47 are given in the aforementioned Japanese Patent Application Laid Open No. P63-46603.

The system controller 25 is constituted by a microcomputer including a processor, ROM, RAM, and a timer, for example. In response to various commands corresponding to key operations supplied from the operation part 48, the system controller 25 executes arithmetical operations on the basis of data or programs stored in the ROM, RAM or the like, and subsequently supplies instruction signals for the play, search, jump operation or the like, to the playing part control circuit 24.

Figure 5:
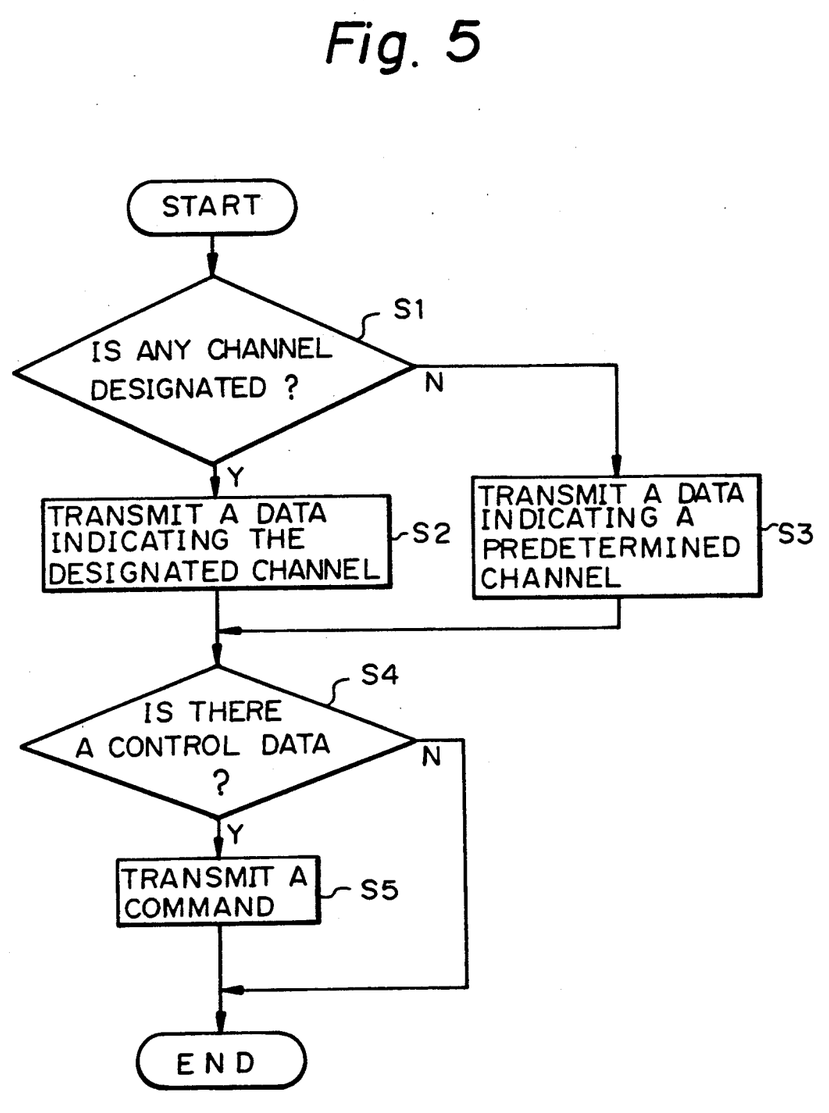
FIG. 5 is a flowchart showing the operation of the processor in the apparatus shown in FIG. 4.

The operation of the processor of the system, controller 25 in the apparatus having the construction mentioned above, will be explained with reference to the flowchart of FIG. 5.

When the operational mode of the player is set to the play mode by the execution of the main routine, a play mode control routine or the like, the processor proceeds to step S1 by an interruption of the timer for example, to detect whether the designation of channel has been made. If it is detected in step S1 that any one of the channels has been designated, the processor then supplies data indicating the designated channel to the ADPCM decoder 40 and to the graphics decoder 46 (step S2). If, on the other hand, it is detected in step S1 that no channel has not been designated, the processor then supplies a predetermined data, for example a data indicating the channel CH2, to the ADPCM decoder 40 and the graphics decoder 46 (step S3).

After the execution of the operation of step S2 or step S3, the processor judges as to whether or not the control data is being output from the ADPCM decoder 40 (step S4). If it is detected in step S4 that the control data is being output, then the processor transmits a command indicated by the control data to the playing part control circuit 24 (step S5), and restarts the execution of the routine whose procedure was taking place immediately before proceeding to step S1. Furthermore, if it is detected in step S4 that the control data is not being output, the processor also restarts the execution of the routine whose procedure was taking place immediately before proceeding to step S1.

By the steps S1 through S3 in the operation described above, the data indicating the designated channel (when a channel has been designated) or the data indicating the predetermined channel (when no channel has been designated) is supplied to the ADPCM decoder. As a consequence, the coded information signal of the channel indicated by the output data of the system controller 25 is selectively decoded in the ADPCM decoder 40, and a digital data is obtained by sampling the audio signal of the channel indicated by the output data of the system controller 25 at a sampling frequency of 37.8 KHz. This output signal of the ADPCM decoder 40 is converted to an analog signal by a D/A converting circuit 41, and in turn mixed with the audio signal of the channel CH1 output from the FM demodulator circuit 35 at the mixing circuit 42.

With this feature, multilingual discs designed for countries where the NTSC system is adopted can be produced. For example, audio signals are recorded such that an audio signal corresponding to the sound effect (SE) is recorded as the audio signal in the channel CH1, an audio signal corresponding to the speech in Japanese is recorded as the audio signal in the channel CH2, an audio signal corresponding to the speed in English is recorded as the audio signal in the channel CH3, an audio signal corresponding to the speech in Chinese is recorded as the audio signal in the channel CH4, and an audio signal corresponding to the speech in Korean is recorded as the audio signal in the channel CH5.

Furthermore, by recording the image of captions in each language as the picture information recorded in the form of the subcode, it becomes possible to obtain the speech in each language also in the form of superimposed captions at the same time as the generation of the speech sound. Therefore, this system can be utilized for learning foreign languages.

In addition, it is conceivable to arrange the system such that the selection of the caption by the subcode is performed at the same time as the section of the speech sound by the ADPCM, so that the Japanese caption, for example, is displayed at the same time as the Japanese speech sound is selected.

Also, by the operation of steps S4 and S5, particular reading operations in each channel are controlled according to control data recorded in each channel. Therefore, besides the advantage that sounds having different contents can be generated from a single disc depending on the selection of channel, different reading operations, i.e., different combinations of the search, pause, or other operations can be attained by a single disc playing apparatus.

So far, the explanation of the present invention has been made with respect to discs of the NTSC system on which an audio signal is recorded in the form of analog signal, by way of example. On the other hand, in the case of discs of the PAL system on which no audio signal is recorded in the form of analog signal, four channels of audio signals can be recorded and reproduced by using the level B of the ADPCM data. In this case, the audio signal corresponding to the sound effect is used as the audio signal of the channel CH1, an audio signal corresponding to speeches in French is used as the audio signal of the channel CH2, an audio signal corresponding to speeches in German is used as the audio signal of the channel CH3, and an audio signal corresponding to speeches in English is used as the audio signal of the channel CH4, and the audio signals of the channels CH1 through CH4 are digitized and recorded as the ADPCM data. By arranging the ADPCM decoder 40 to decode ADPCM data of the channel CH1 and the designated channel, the same feature as with the discs of the NTSC system can be obtained.

Additionally, in the case of music software, a recording can be performed in such a manner that the so called minus 1 (or minus 2, minus 3 . . . ) is recorded in the channel CH1, and the part excluded from the minus 1 is recorded in the channel CH2, and other excluded part is recorded in the channel CH3. With this type of recording, various parts selected arbitrarily can be mixed together at the time of play-back.

As explained in the foregoing, in the recording and reproducing method according to the present invention, a sampling operation at a predetermined frequency is respectively performed against N (N is an integer equal to or greater than 3) channels or M (M is an integer equal to or greater than 2) channel audio signals, a modulation operation of a predetermined modulation system is performed respectively for each of N or M channels of the sampled data, an identification code identifying each channel is added to each of N or M channel coded information signals, and subsequently the coded information signals are multiplexed by a time division multiplexing operation and recorded on a recording medium together with a channel of analog audio signal or by themselves. At the time of play-back, at least two of the N channel coded information signals designated by a command or at least two of the M channel coded information signals and the one channel analog audio signal designated by the command are selected and decoded arbitrarily using the identification code, and a reproduction signal is generated by mixing the at least two channels of audio signal.

Therefore with the method according to the present invention, a single disc can be used for recording multilingual sounds, and reproduced information will become much easier to understand as compared with the case where only the superimposed caption is provided. Furthermore, with respect to the production of discs, it will become only necessary to prepare one disc. Thus, the control of production process will also become much easier. In that case, a plurality of sound sources in different languages must be prepared. However, there are more advantages than shortages in an overall viewpoint. Especially, the use of the method according to the present invention is advantageous in Europe where a plurality of languages are used in the same continent, or multilingual countries such as the Soviet Union and China. In addition, the method can be effectively applied for the preparation of musical software.

Moreover, other various applications of the method according to the present invention are also conceivable since a plurality of audio channels are available. For instance, a channel for an explanation of the recorded software can be provided. Since the explanation is presented in the voice, it is more effective than conventional liner notes. Assume that a narration by a famous commentator is inserted into a movie program. In that case, it is possible to compose the program such that an indication of a program area to be searched is given in the narration of the commentator, and an explanation given by the commentator is automatically provided together with the pictures of the searched area when the designated program area is searched in accordance with the operation by the user. Moreover, in this case, the system can be arranged such that the searching operation is automatically performed by using the control codes.

What is claimed is:

1. A method for recording and reproducing information including N (N is an integer equal to or greater than 3) channel audio signals on and from a recording medium, comprising the steps of:

sampling said N channel audio signals respectively at a predetermined sampling rate;

modulating each of N channel data obtained by the sampling step, by using a predetermined digital modulation process respectively;

recording N channel coded information signals obtained by the modulating step on said recording medium by using a time division multiplex process, after adding an identification code for identifying each channel to each of said N channel coded information signals;

at the time of reproduction, selectively demodulating at least two of said N channel coded information signals in response to a selecting command by using said identification code; and producing a reproduction signal by mixing in a mixing circuit at least two audio signals obtained by the demodulating step.

2. A recording and reproducing method as claimed in claim 1, wherein control information for controlling operations of reading information recorded on said recording medium is included in each of said N channel coded information signals when said N channel coded information signals are recorded on said recording medium, and, at the time of reproduction, the order of reproduction of the information recorded on said recording medium is controlled in accordance with said control information.

3. A recording and reproducing method as claimed in claim 1, wherein a multiplex signal obtained by said time division multiplex process of said coded information signals, and a video signal to be reproduced at the same time, are multiplexed and recorded on said recording medium by using a frequency division multiplex process.

4. A recording and reproducing method as claimed in claim 1, wherein a plurality of graphics codes respectively including each of a plural channel picture information corresponding to said N channels and said identification code are recorded on said recording medium as a subcode of said coded information signal and, at the time of reproduction, one of said plurality of graphics codes is selectively demodulated in response to a selection command by using said identification code.

5. A method for recording information including N (N is an integer equal to or greater than 3) channel audio signals on a recording medium, comprising the steps of:

digitally sampling said N channel audio signals respectively at a predetermined sampling rate;

modulating each of N channel data obtained by the sampling step, by using a predetermined digital modulation process;

recording N channel coded information signals obtained by the modulating step on said recording medium by using a time division multiplex process after adding an identification code for identifying each channel to each of said N channel coded information signals.

6. An apparatus for recording information including N (N is an integer equal to or greater than 3) channel audio signals on a recording medium comprising:

a sampling means for sampling said N channel audio signals at a predetermined sampling rate;

a digital modulation means for respectively modulating N channel data obtained by said sampling means by using an adaptive-delta modulation process;

an identification code adding means for adding an identification code for identifying each channel to each of N channel coded information signals obtained by said digital modulation means;

a multiplexing means for multiplexing said N channel coded information signals to which said identification signal is added respectively, by using a time division multiplexing process; and a recording means for recording an output signal of said multiplexing means on said recording medium.

7. A method for recording and reproducing information including M (M is an integer equal to or greater than 2) channel audio signals on and from a recording medium, comprising the steps of:

receiving at least one channel analog audio signal;

sampling said M channel audio signals respectively at a predetermined sampling rate;

modulating each of M channel data obtained by the sampling step, by using a predetermined digital modulation process respectively;

multiplexing said M channel coded information signals by using a time division multiplex process after adding an identification code for identifying each channel to each of said M channel coded information signals;

recording said M channel coded information signals obtained by said multiplexing step together with said at least one channel analog audio signal on said recording medium by using a frequency division multiplex process;

at the time of reproduction, selectively demodulating at least two of said M channel coded information signals and said at least one channel analog audio signal in response to a selecting command by using said identification code; and producing a reproduction signal by mixing in a mixing circuit at least two audio signals obtained by the demodulating step.

8. A recording and reproducing method as claimed in claim 7, wherein control information for controlling operations of reading information recorded on said recording medium is included in each of said M channel coded information signals, when said M channel coded information signals are recorded on said recording medium, and, at the time of reproduction, the order of reproduction of the information recorded on said recording medium is controlled in accordance with said control information.

9. A recording and reproducing method as claimed in claim 7, wherein a plurality of graphics codes respectively including each of plural channel picture information corresponding to said M channels and said identification code are recorded on said recording medium as a subcode of said coded information signals, and at the time of reproduction, one of said plurality of graphics codes is selectively demodulated in response to a selection command by using said identification code.

10. A method for recording information including M (M is an integer equal to or greater than 2) channel audio signals on a recording medium, comprising the steps of:

receiving at last one channel analog audio signal;

sampling said M channel audio signals respectively at a predetermined sampling rate;

modulating each of M channel data obtained by the sampling step, by using a predetermined digital modulation process;

multiplexing said M channel coded information signals by using a time division multiplex process after adding an identification code for identifying each channel to each of said M channel coded information signals; and recording said M channel coded information signals obtained by said multiplexing step together with said at least one channel analog audio signal on said recording medium by using a frequency division multiplex process.

11. An apparatus for recording information including M (M is an integer equal to or greater than 2) channel audio signals on a recording medium, comprising:

a receiving means for receiving at least one channel analog audio signal;

a sampling means for sampling said M channel audio signals at a predetermined sampling rate;

a modulation means for respectively modulating each of M channel data obtained by said sampling means by using a predetermined digital modulating process;

an identification code adding means for adding an identification code for identifying each channel to each of M channel coded information signals obtained by said digital modulation means;

a multiplexing means for multiplexing said M channel coded information signals to which said identification signal is added, respectively, by using a time division multiplexing process; and a recording means for recording an output signal of said multiplexing means and a signal corresponding to said one channel analog audio signal on said recording medium by using a frequency division multiplex process.

* * * * *